United States Patent
Houck (10) Patent No.: US 11,693,164 B2
(45) Date of Patent: Jul. 4, 2023

(54) MULTI-TRANSMISSION OPTICAL FILTER

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 234 days.

(21) Appl. No.: 16/948,960

(22) Filed: Oct. 7, 2020

(65) Prior Publication Data

US 2021/0109266 A1   Apr. 15, 2021

Related U.S. Application Data

(60) Provisional application No. 62/912,951, filed on Oct. 9, 2019.

(51) Int. Cl.
*G02B 5/28* (2006.01)
*G02B 5/08* (2006.01)

(52) U.S. Cl.
CPC ............... *G02B 5/281* (2013.01); *G02B 5/08* (2013.01)

(58) Field of Classification Search
None
See application file for complete search history.

(56) References Cited

U.S. PATENT DOCUMENTS

2017/0236861 A1 * 8/2017 Ockenfuss ............... G02B 5/26
  257/432
2019/0296067 A1   9/2019 Hendrix et al.

FOREIGN PATENT DOCUMENTS

| EP | 3112828 A1 | 1/2017 |
| EP | 3206060 A1 | 8/2017 |
| FR | 2820513 A1 | 8/2002 |

OTHER PUBLICATIONS

International Search Report and Written Opinion for Application No. PCT/US2020/070633, dated Jan. 20, 2021, 11 pages.

* cited by examiner

*Primary Examiner* — Elmito Breval
(74) *Attorney, Agent, or Firm* — Harrity & Harrity, LLP (57) ABSTRACT

An optical filter may include an interference filter that passes at least two channels associated with at least two transmission peaks; and a plurality of blockers, wherein each blocker, of the plurality of blockers, passes a respective channel associated with a respective transmission peak of the at least two transmission peaks and blocks one or more channels other than the respective channel associated with the respective transmission peak.

20 Claims, 5 Drawing Sheets

MULTI-TRANSMISSION OPTICAL FILTER

CROSS-REFERENCE TO RELATED APPLICATION

This Patent Application claims priority to U.S. Provisional Patent Application No. 62/912,951, filed on Oct. 9, 2019, and entitled "MULTI-TRANSMISSION OPTICAL FILTER." The disclosure of the prior Application is considered part of and is incorporated by reference into this Patent Application.

BACKGROUND

An interference filter is an optical filter that reflects one or more spectral bands or lines and transmits others. An interference filter may be wavelength-selective by virtue of the interference effects that take place between the incident and reflected waves at boundaries of the interference filter.

SUMMARY

According to some implementations, an optical filter may include an interference filter that passes at least two channels associated with at least two transmission peaks; and a plurality of blockers, wherein each blocker, of the plurality of blockers, passes a respective channel associated with a respective transmission peak of the at least two transmission peaks and blocks one or more channels other than the respective channel associated with the respective transmission peak.

According to some implementations, a sensor device may include an optical sensor to collect data using a plurality of channels; and an optical device comprising: a spacer; and a first mirror and a second mirror, wherein the optical device is associated with at least two transmission peaks; and a plurality of blockers affixed to the optical device, wherein each blocker, of the plurality of blockers, passes a respective channel, of the plurality of channels, associated with a respective transmission peak of the at least two transmission peaks.

According to some implementations, a binary multispectral filter may include a plurality of interference filters, and a plurality of blockers, wherein each interference filter, of the plurality of interference filters, is configured to pass a respective pair of channels associated with a respective pair of transmission peaks, wherein an interference filter, of the plurality of interference filters, is associated with a first blocker, of the plurality of blockers, that is configured to pass a channel associated with a first transmission peak, of the respective pair of transmission peaks, and block a channel associated with a second transmission peak of the respective pair of transmission peaks, and wherein the interference filter is associated with a second blocker, of the plurality of blockers, that is configured to pass the channel associated with the second transmission peak and block the channel associated with the first transmission peak.

DETAILED DESCRIPTION

The following detailed description of example implementations refers to the accompanying drawings. The same reference numbers in different drawings may identify the same or similar elements.

An optical sensor may use a filter to transmit light at a desired frequency for a sensing operation. For example, the optical sensor may perform sensing with regard to one or more frequency ranges, referred to herein as channels. In some cases, an optical sensor may use an interference filter to transmit a channel and block unwanted frequencies of light. An interference filter (e.g., an interferometer, a Fabry-Perot interferometer, an etalon, a Lyot filter, and/or the like) may transmit light associated with a transmission peak based on a geometry and a material composition of the interference filter. In some implementations, an interference filter may be configurable to transmit a channel associated with a transmission peak that is within a free spectral range (FSR) of the interference filter, so that the optical sensor can perform sensing with regard to the channel.

It may be beneficial to perform sensing of multiple channels using a single optical sensor. To facilitate the sensing of multiple channels, the FSR of the interference filter can be manipulated by varying the geometry and/or material composition of the interference filter. However, a larger FSR may lead to larger resonator bandwidth and thus a poor spectral resolution, so extending the FSR to broaden the range of addressable channels may not be a viable solution in all use cases. If the optical sensor is to perform sensing of multiple channels, the interference filter can be fabricated with two or more different spacer thicknesses, which may cause the interference filter to transmit two or more corresponding channels. However, the usage of multiple spacer thicknesses may complicate fabrication of the optical filter and may be difficult or impossible to achieve using some deposition technologies.

If the interference filter is configured to transmit a channel associated with a transmission peak in certain regions of the FSR, then the interference filter may also pass a second channel associated with a second transmission peak at a different frequency than the desired transmission peak (e.g., due to a harmonic effect). For example, if the interference filter is configured to transmit a transmission peak occurring in a region of the FSR susceptible to harmonic effects, the interference filter may also transmit a second transmission peak that might overlap with a desired channel. In such a case, the optical sensor may detect noise in the desired channel if the interference filter (or another filter) is not configured to block unwanted harmonic transmission peaks.

Implementations described herein provide an interference filter that transmits channels associated with two or more transmission peaks for measurement by an optical sensor: a first transmission peak (e.g., in a harmonic region of an FSR of the interference filter) and a second transmission peak that is harmonically related to the corresponding first transmission peak. The interference filter may include two or more blockers corresponding to the two or more transmission peaks. Each blocker may pass a respective channel associated with a respective one of the two or more transmission peaks, and may block one or more other transmission peaks of the two or more transmission peaks. The blockers may enable the usage of transmission peaks in regions of the FSR that would otherwise cause harmonic interference. For example, this may enable an optical sensor that performs sensing in the near-infrared (NIR) spectral range and in a visible spectral range (e.g., a red light wavelength range, a biologically significant wavelength range, and/or the like) without increasing design complexity or fabrication difficulty in comparison to a variable spacer design.

Figure 1:
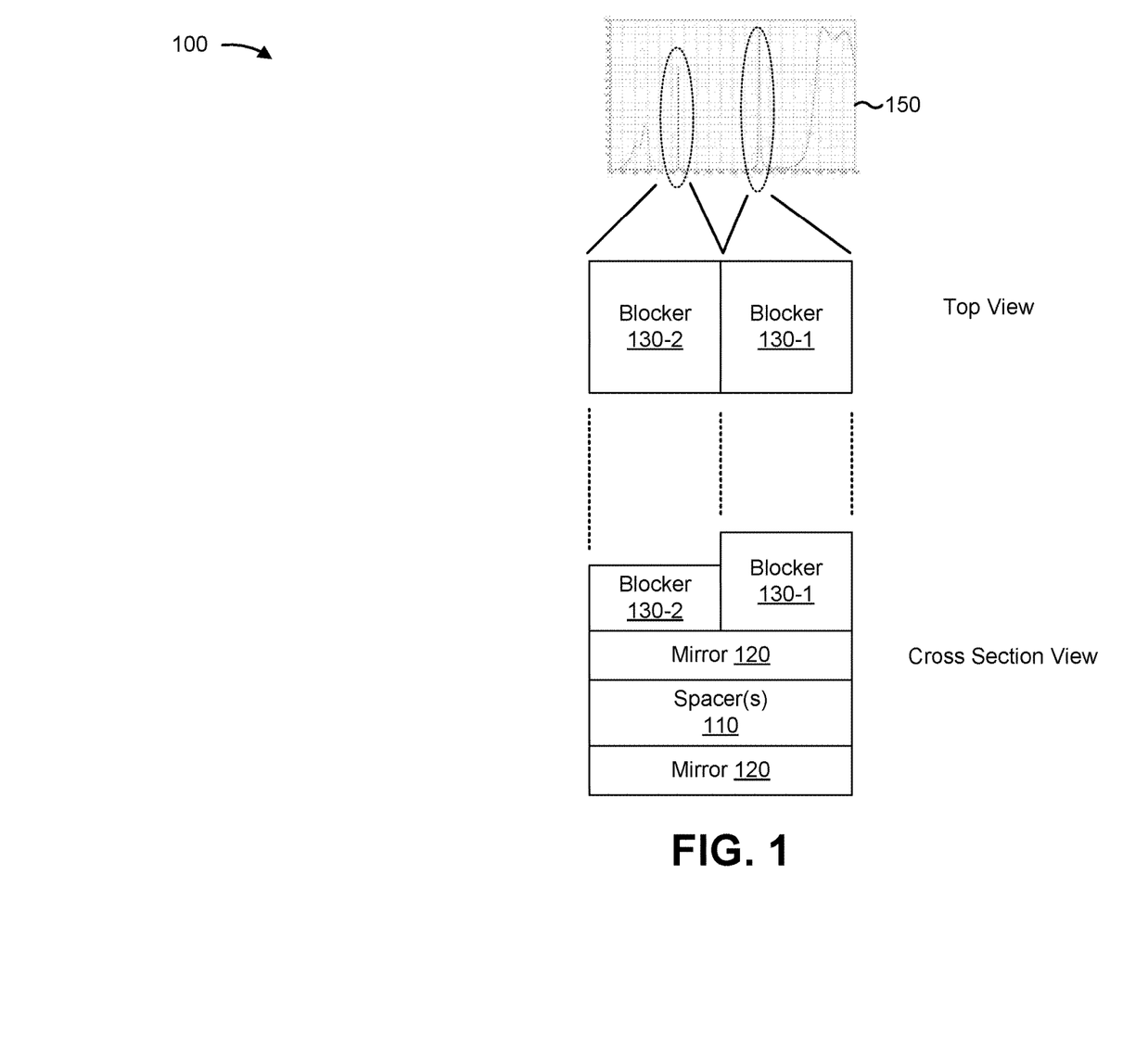
FIG. 1 is a diagram of an example interference filter.

FIG. 1 is a diagram of an example interference filter 100. In some implementations, interference filter 100 may comprise a spectral filter, a multispectral filter (e.g., a binary multispectral filter and/or the like), or the like. In some aspects, interference filter 100 may be included in a biometric sensor device, a security sensor device, a health monitoring sensor device, an object identification sensor device, a spectroscopic identification sensor device, a sensor of a wearable device, and/or the like. As shown, interference filter 100 includes one or more spacers 110, a set of mirrors 120, and a set of blockers 130-1 and 130-2. The propagation of light via spacer 110 and the reflection of the light by mirrors 120 may create interference, and may pass light associated with only a specific channel or frequency range (e.g., a transmission peak). The channel may be configurable by varying the thickness of spacer 110 or the material properties of spacer 110 and/or mirror 120. For example, when the thickness of spacer 110 is changed, interference filter 100's channel may shift upward or downward. Similarly, if different regions of spacer 110 have different thicknesses, or if different spacers 110 of interference filter 100 have different thicknesses, the different regions or different spacers 110 may pass channels associated with different transmission peaks. Also, varying the material properties of spacer 110 and/or mirror 120 may shift the transmission peak upward or downward. Spacer 110 may comprise any material capable of passing light, such as a glass, a polymer, a substrate, and/or the like. For example, spacer 110 may include silicon dioxide (SiO2), hydrogenated silicon (Si:H), niobium-titanium-oxide (NbTiOx), niobium-tantalum-oxide (NbTaOx), zinc oxide (ZnO), or the like. Si:H may provide material absorption in a region where a harmonic transmission peak is likely to occur for a given design, meaning that the use of Si:H may provide the functionality of blocker 130 with regard to the harmonic transmission peak. In some aspects, interference filter 100 may comprise a single blocker 130 that blocks a first transmission peak, and a spacer 110 partially composed of Si:H that blocks a second transmission peak. For example, a region of interference filter 100 not covered by the single blocker 130 may include a spacer 110 composed of Si:H, thus reducing cost associated with implementing multiple blockers. Thus, a blocker may be implemented in a hydrogenated silicon spacer 110 of the interference filter 100. Mirror 120 may comprise a reflecting layer, such as a reflective glass layer and/or the like. Mirrors 120 may be affixed to opposite sides of spacer 110. In some aspects, mirror 120 may be composed of a reflective material, such as a silver layer and/or the like. In some aspects, mirrors 120 and spacer 110 may collectively have a thickness less than a threshold. For example, mirrors 120 and spacer 110 may form a Fabry-Perot interferometer with a thickness less than approximately 3 microns.

As shown, interference filter 100 includes a plurality of blockers 130. Blocker 130 includes a device capable of blocking (e.g., reflecting, absorbing, or a combination thereof) light associated with a first frequency and passing (e.g., transmitting) light associated with a second frequency. For example, blocker 130 may include an optical filter. In some implementations, blocker 130 may be affixed to a surface of interference filter 100. In some implementations, blockers 130 may be non-overlapped with regard to each other on the surface of interference filter 100.

In the example shown in FIG. 1, blocker 130-1 is configured to pass a channel at approximately 1100 nm (indicated by the dashed oval around the right-hand transmission peak of the transmission chart 150) and blocker 130-2 is configured to pass a channel at approximately 775 nm (indicated by the dashed oval around the left-hand transmission peak of the transmission chart 150). The transmission chart 150 is described in more detail in connection with FIG. 3.

Each blocker 130 may be configured to block one or more channels other than the channel passed by that blocker 130. For example, blocker 130-1 may be configured to block light of the wavelength associated with blocker 130-2 (e.g., approximately 775 nm) and blocker 130-2 may be configured to block light of the wavelength associated with blocker 130-1 (e.g., approximately 1100 nm). In this way, interference filter 100 can utilize transmission peaks that are associated with harmonic transmission peaks by blocking unwanted frequencies using blocker 130, thereby reducing interference and increasing accuracy of measurements performed by an optical sensor associated with interference filter 100.

A transmission peak, and a corresponding harmonic transmission peak associated with the transmission peak, can be identified using a method for analyzing the propagation of electromagnetic waves through a stratified medium. In one example, the transmission peak and the corresponding harmonic transmission peak can be determined using a transfer-matrix method. For example, the transfer-matrix method may identify a harmonic response associated with mirrors 120 and spacer 110 based at least in part on geometry and material composition of mirrors 120 and spacer 110. The harmonic response may indicate a transmission peak and one or more corresponding harmonic transmission peaks.

Figure 4:
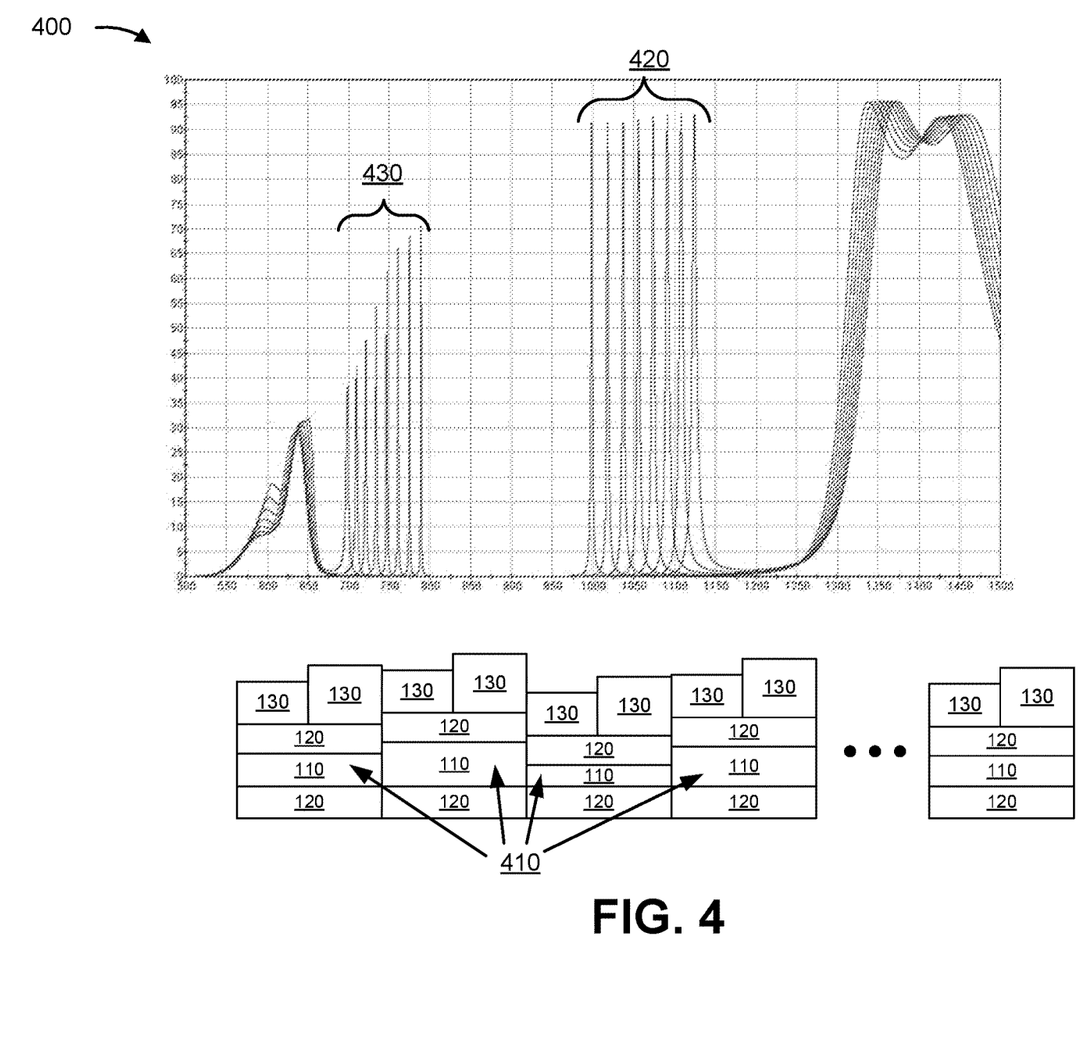
FIG. 4 is a diagram illustrating an example transmission chart for an interference filter associated with spacers of multiple different thicknesses.
Figure 5:
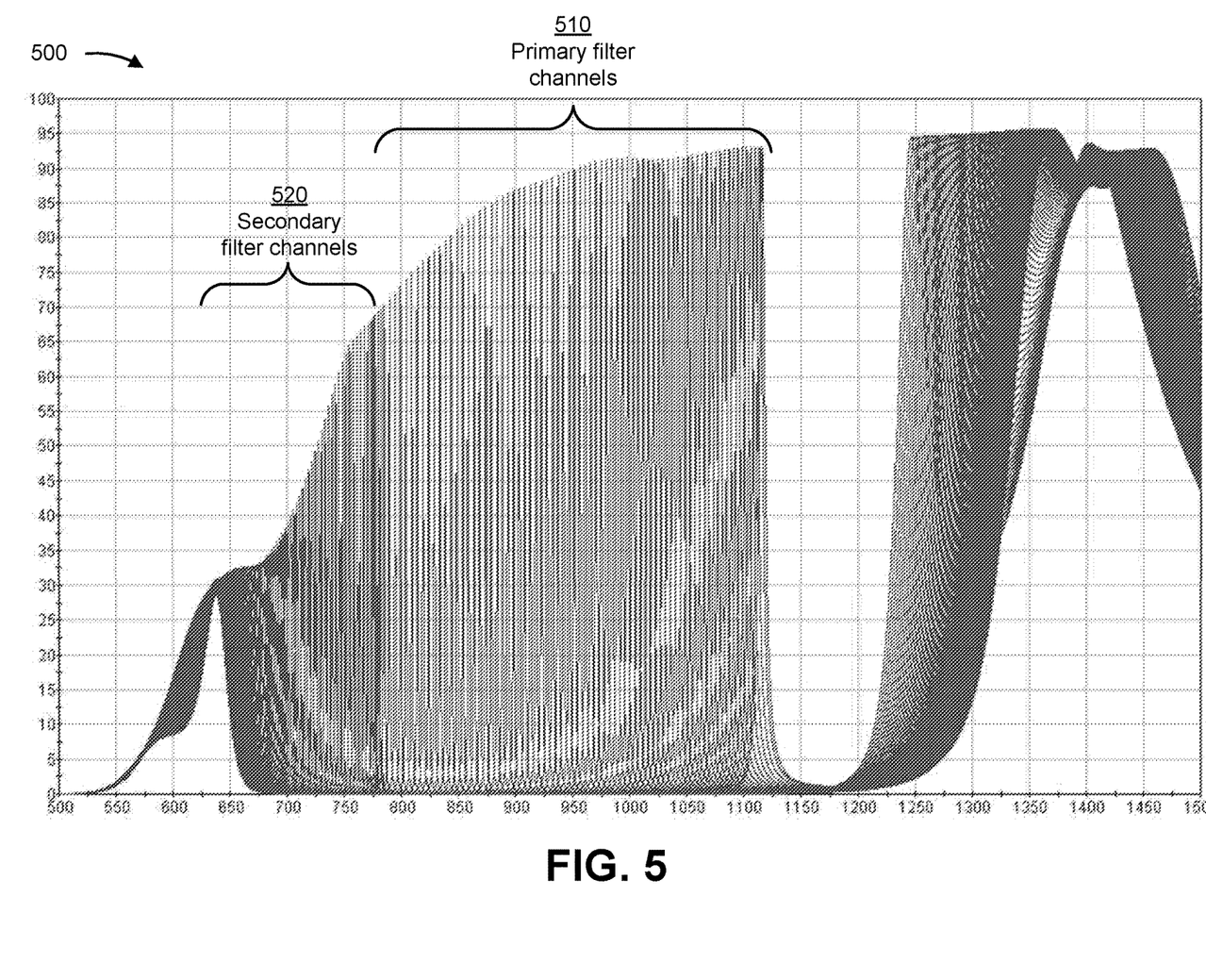
FIG. 5 is a diagram illustrating an example transmission chart for an interference filter.

Interference filter 100 can include a plurality of different thicknesses of spacer 110. Each thickness of spacer 110 may be associated with a respective pair of transmission peaks (or a respective plurality of transmission peaks) and a corresponding set of blockers 130. Examples of transmission charts associated with such implementations are shown in FIGS. 4 and 5. In some aspects, spacer 110 and mirror 120 may be configured such that spacer 110 and mirror 120 create a transmission peak and a corresponding harmonic transmission peak. For example, a thickness of spacer 110 and mirror 120, material properties of spacer 110 and mirror 120, and/or the like, may be configured to cause spacer 110 and mirror 120 to transmit the transmission peak and one or more corresponding harmonic transmission peaks.

As indicated above, FIG. 1 is provided merely as an example. Other examples may differ from what is described with regard to FIG. 1.

Figure 2:
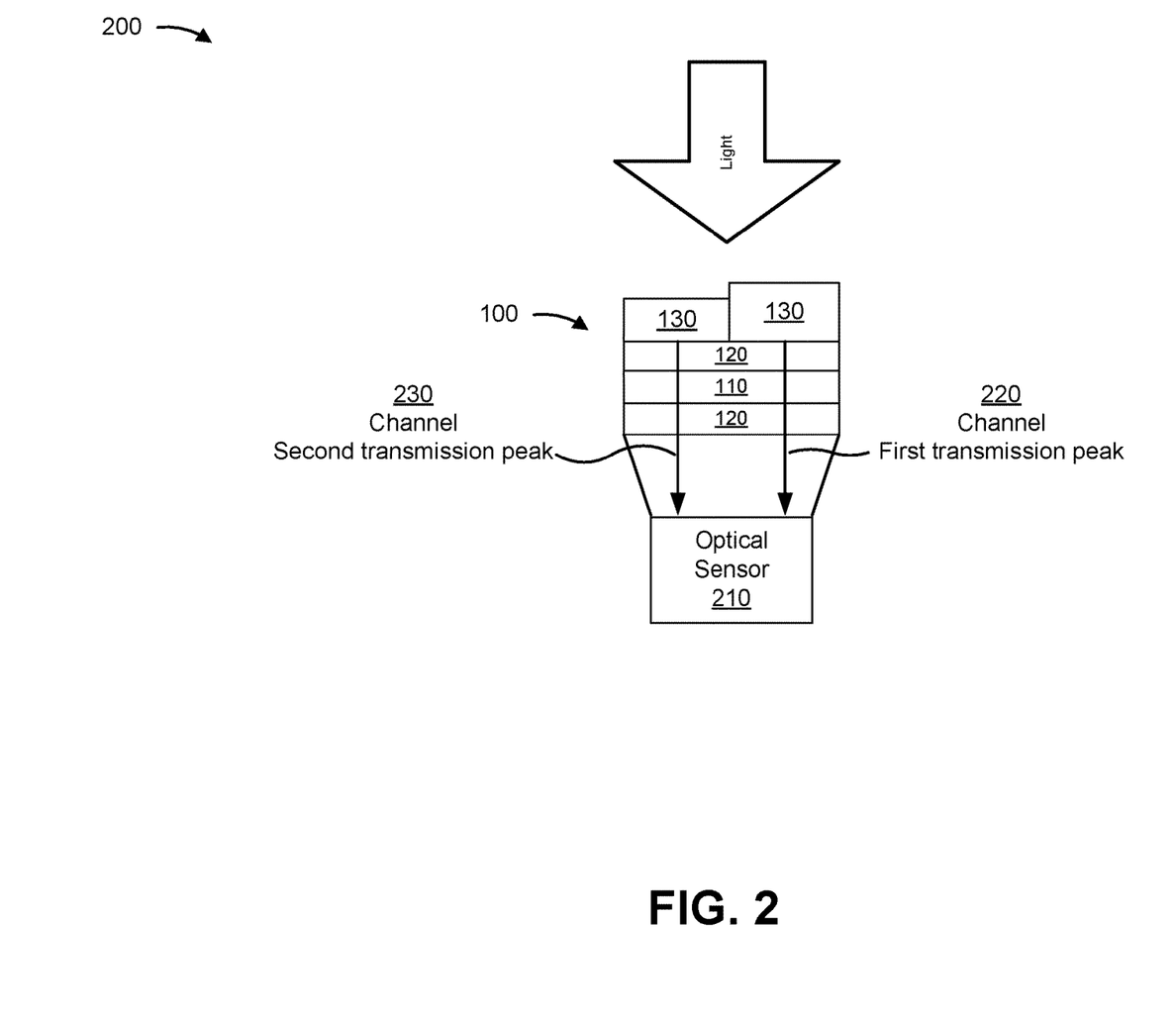
FIG. 2 is a diagram of an example device incorporating an interference filter.

FIG. 2 is a diagram of an example device 200 incorporating an interference filter 100. Device 200 comprises any device that includes an interference filter 100 and an optical sensor 210. In some aspects, device 200 is an optical device. Interference filter 100 is described in more detail elsewhere herein. In some implementations, device 200 may be a sensor device, such as a spectrometer, a spectral sensor (e.g., a binary multispectral (BMS) sensor), and/or the like. As shown, device 200 includes interference filter 100 and an optical sensor 210. Optical sensor 210 includes a device capable of sensing light. For example, optical sensor 210 may include an image sensor, a multispectral sensor, a spectral sensor, and/or the like. In some implementations, optical sensor 210 may include a charge-coupled device (CCD) sensor, a complementary metal-oxide semiconductor (CMOS) sensor, and/or the like. In some implementations, optical sensor 210 may include a front-side illumination (FSI) sensor, a back-side illumination (BSI) sensor, and/or the like. As shown by reference number 220, a first blocker 130 of interference filter 100 may pass a channel associated with a first transmission peak. As shown by reference number 230, a second blocker 130 of interference filter 100 may pass a channel associated with a second transmission peak.

As indicated above, FIG. 2 is provided merely as an example. Other examples may differ from what is described with regard to FIG. 2.

Figure 3:
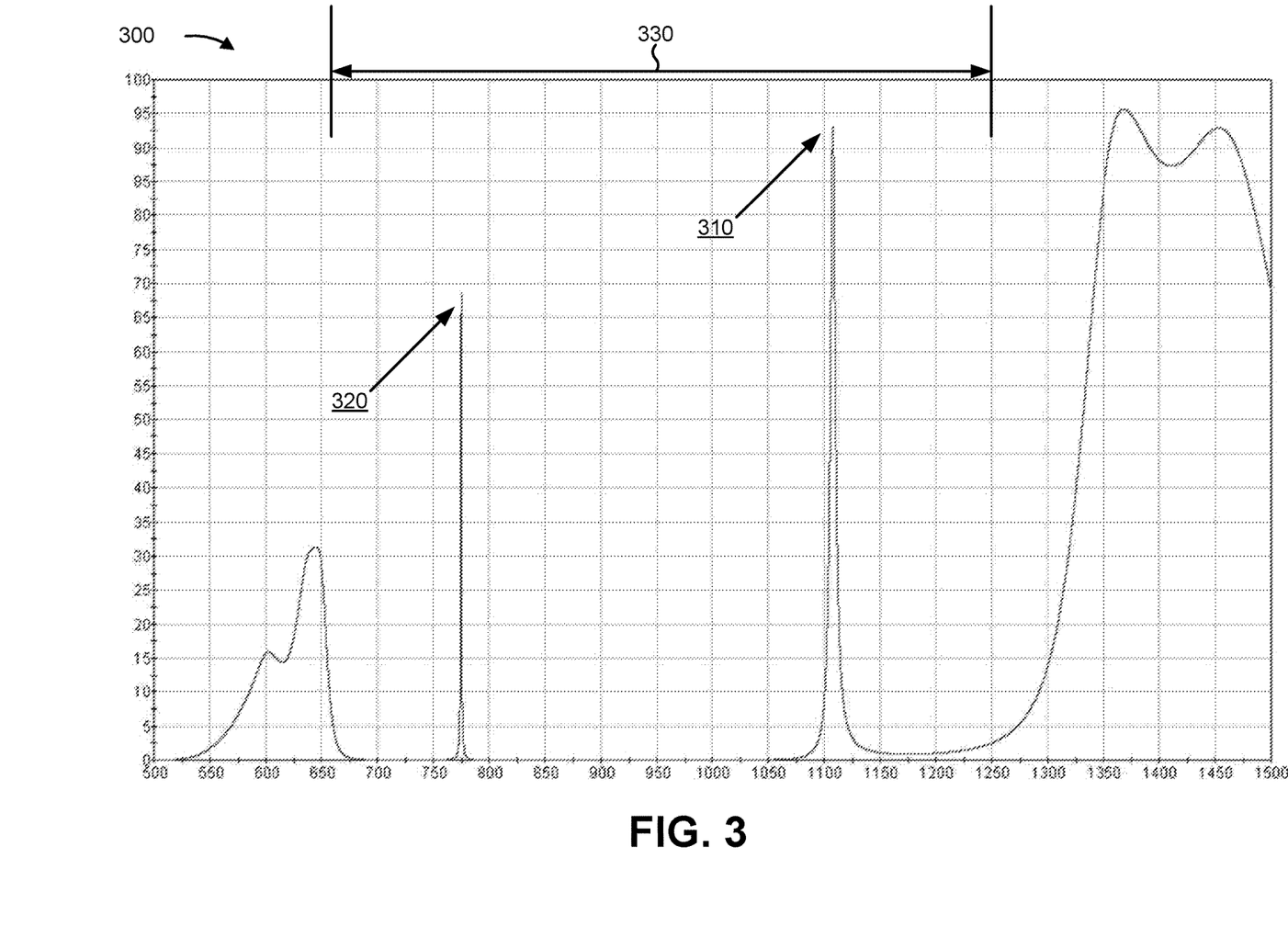
FIG. 3 is a diagram illustrating an example transmission chart for an interference filter.

FIG. 3 is a diagram illustrating an example transmission chart 300 (e.g., transmission chart 150) for an interference filter 100. As shown, transmission chart 300 includes a first transmission peak 310 and a second transmission peak 320. For example, the first transmission peak 310 may occur in a region of a free spectral range (FSR) 330 of interference filter 100 that is associated with a harmonic transmission peak of the first transmission peak 310 (i.e., second transmission peak 320).

The harmonic peak may interfere with a sensing operation of a sensor device (e.g., device 200). For example, consider an interference filter that is configured to pass a first channel at approximately 775 nm (e.g., as a primary channel, rather than as a harmonic of another channel) and a second channel at approximately 1100 nm. In this case, the interference filter may pass a harmonic transmission peak of the second channel at 775 nm in addition to the first channel at 775 nm. Thus, the interference filter may cause interference with the first channel at 775 nm due to the overlap of the first channel and the harmonic transmission peak.

By utilizing blockers 130 and the harmonic transmission peak associated with the first transmission peak 310, interference filter 100 may reduce interference, and the effective spectral range of interference filter 100 may be increased. For example, rather than configuring two spacers of an interference filter to pass the first channel and the second channel (which may cause interference between the first channel and a harmonic transmission peak of the second channel), interference filter 100 may use a single spacer to pass the second channel (associated with first transmission peak 310) and the harmonic transmission peak of the second channel (associated with second transmission peak 320). Respective blockers of interference filter 100 may block one of the first channel and the second channel. Thus, interference filter 100 may pass light associated with two transmission peaks at a single spacer thickness, thereby simplifying fabrication of interference filter 100 and increasing the number of channels that can be passed by interference filter 100 for a given spacer thickness profile.

FIG. 4 is a diagram illustrating an example transmission chart 400 for an interference filter (e.g., interference filter 100) associated with spacers 110 of multiple different thicknesses. Here, five of eight regions of the interference filter are shown by way of example only, and the regions that are not shown are indicated by the ellipsis. As shown by reference number 410, the interference filter may include spacers 110 of multiple different thicknesses. As shown, each spacer 110 is associated with a respective set of mirrors 120 and a respective plurality (e.g., a corresponding pair) of blockers 130.

Each region of the interference filter may pass a respective channel based on the respective thicknesses of the spacers 110 and/or material properties of the spacers 110 and/or the mirrors 120. The respective channels are shown by reference number 420. Furthermore, if the respective channels are in the region of the FSR associated with respective harmonic transmission peaks, each region of the interference filter may pass a channel associated with a respective harmonic transmission peak. The respective channels associated with the harmonic transmission peaks are shown by reference number 430. As shown, each region of the interference filter associated with a different spacer thickness may be associated with a respective pair of spacers 110. One spacer 110 of each pair may block a channel shown by reference number 420, and the other spacer 110 of each pair may block a channel shown by reference number 430. In this way, the number of channels passed by the interference filter is increased relative to an approach where the interference filter is configured to pass single channels outside of the region of the FSR associated with the harmonic effect.

FIG. 5 is a diagram illustrating an example transmission chart 500 for an interference filter (e.g., interference filter 100). As shown by chart 500, in some implementations, the interference filter may multiple primary filter channels 510 and multiple secondary filter channels 520. Each secondary filter channel 520 may be associated with a harmonic transmission peak of a corresponding primary filter channel 510. As shown, the primary filter channels 510 and the secondary filter channels 520 may be at a spacing of approximately 5 nm relative to each other. This may be achieved by configuring properties of mirror 120 or spacer 110. Thus, the spacing and number of channels addressable by a sensor device (e.g., device 200) may be increased relative to an approach that does not utilize secondary filter channels 520.

As indicated above, FIG. 5 is provided as an example. Other examples may differ from what is described with regard to FIG. 5.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical filter, comprising:
   an interference filter that passes at least two channels associated with at least two transmission peaks; and
   a plurality of blockers,
      wherein each blocker, of the plurality of blockers, is affixed to a same surface of the interference filter, passes a respective channel associated with a respective transmission peak of the at least two transmission peaks, and blocks one or more channels other than the respective channel associated with the respective transmission peak.

2. The optical filter of claim 1, wherein a first transmission peak, of the at least two transmission peaks, is a harmonic transmission peak of a second transmission peak of the at least two transmission peaks.

3. The optical filter of claim 1, wherein the plurality of blockers include a first blocker and a second blocker and the at least two transmission peaks include a first transmission peak and a second transmission peak,
   wherein the first blocker passes a channel, of the at least two channels, associated with the first transmission peak and blocks a channel, of the at least two channels, associated with the second transmission peak, and
   wherein the second blocker passes the channel associated with the second transmission peak and blocks the channel associated with the first transmission peak.

4. The optical filter of claim 1, wherein the plurality of blockers are non-overlapped with each other.

5. The optical filter of claim 1, wherein the at least two transmission peaks include a first set of transmission peaks and a second set of transmission peaks, and
   wherein the second set of transmission peaks are harmonically related to corresponding transmission peaks of the first set of transmission peaks.

6. The optical filter of claim 5, wherein the plurality of blockers comprises a first blocker and a second blocker,
   wherein the first blocker is configured to pass a set of channels, of the at least two channels, associated with the first set of transmission peaks and to block a set of channels, of the at least two channels, associated with the second set of transmission peaks, and
   wherein the second blocker is configured to block the set of channels associated with the first set of transmission peaks and pass the set of channels associated with the second set of transmission peaks.

7. The optical filter of claim 1, wherein at least one transmission peak, of the at least two transmission peaks, is outside of a free spectral range of the interference filter.

8. The optical filter of claim 1, wherein the interference filter comprises a first mirror, a second mirror, and a spacer between the first mirror and the second mirror.

9. The optical filter of claim 8, wherein the spacer comprises a hydrogenated silicon spacer.

10. The optical filter of claim 1, wherein the interference filter comprises a mirror, and
    wherein the same surface is on the mirror.

11. A sensor device, comprising:
    an optical sensor to collect data using a plurality of channels; and
    an optical device, comprising:
       a spacer; and
       a first mirror and
       a second mirror,
          wherein the optical device is associated with at least two transmission peaks; and
       a plurality of blockers affixed to the optical device,
          wherein each blocker, of the plurality of blockers, is affixed to a surface of the first mirror and passes a respective channel, of the plurality of channels, associated with a respective transmission peak of the at least two transmission peaks.

12. The sensor device of claim 11, wherein the optical device further comprises a plurality of spacers that include the spacer, and
    wherein each spacer, of the plurality of spacers, is associated with a respective set of transmission peaks.

13. The sensor device of claim 11, wherein a first transmission peak, of the at least two transmission peaks, is associated with a near-infrared spectral range, and
    wherein a second transmission peak, of the at least two transmission peaks, is associated with a visible spectral range.

14. A spectral filter, comprising:
    a plurality of interference filters; and
    a plurality of blockers,
       wherein each interference filter, of the plurality of interference filters, is configured to pass a respective pair of channels associated with a respective pair of transmission peaks,
       wherein an interference filter, of the plurality of interference filters, is associated with a first blocker, of the plurality of blockers, that is configured to pass a channel associated with a first transmission peak, of the respective pair of transmission peaks, and block a channel associated with a second transmission peak of the respective pair of transmission peaks,
       wherein the interference filter is associated with a second blocker, of the plurality of blockers, that is configured to pass the channel associated with the second transmission peak and block the channel associated with the first transmission peak, and
       wherein the first blocker and the second blocker are affixed to a same surface of the interference filter.

15. The spectral filter of claim 14, wherein the second transmission peak is a harmonic transmission peak of the first transmission peak.

16. The spectral filter of claim 14, wherein each interference filter, of the plurality of interference filters, is associated with a respective pair of blockers.

17. The spectral filter of claim 16, wherein each pair of blockers, of the respective pair of blockers, comprises a respective first blocker and a respective second blocker,
    wherein the respective first blocker is configured to block a channel associated with a respective first transmission peak, of a corresponding pair of transmission peaks, and pass a channel associated with a respective second transmission peak of the corresponding pair of transmission peaks, and
    wherein the respective second blocker is configured to pass the channel associated with the respective second transmission peak and block the channel associated with the respective first transmission peak.

18. The spectral filter of claim 14, wherein the first transmission peak is associated with a near-infrared spectral range and the second transmission peak is associated with a visible spectral range.

19. The spectral filter of claim 14, wherein the interference filter comprises a first mirror and a second mirror, and wherein the same surface is on the first mirror.

20. The spectral filter of claim 14, wherein the first blocker is affixed to a first portion of the same surface, and wherein the second blocker is affixed to a second portion of the same surface.

\* \* \* \* \*